United States Patent
Kotnig et al.

(10) Patent No.: US 12,078,283 B2
(45) Date of Patent: Sep. 3, 2024

(54) THERMALLY INSULATED TRANSFER LINE WITH COUPLING ELEMENT

(71) Applicant: MAGNA Energy Storage Systems GesmbH, Sinabelkirchen (AT)

(72) Inventors: Claudio Kotnig, Nestelbach (AT); Rainer Puchleitner, Graz (AT)

(73) Assignee: MAGNA Energy Storage Systems GesmbH, Sinabelkirchen (AT)

( * ) Notice: Subject to any disclaimer, the term of this patent is extended or adjusted under 35 U.S.C. 154(b) by 0 days.

(21) Appl. No.: 18/159,444

(22) Filed: Jan. 25, 2023

(65) Prior Publication Data

US 2023/0272875 A1 Aug. 31, 2023

(51) Int. Cl.
*F16L 59/18* (2006.01)
*F16L 59/065* (2006.01)
*F16L 59/14* (2006.01)

(52) U.S. Cl.
CPC .......... *F16L 59/182* (2013.01); *F16L 59/065* (2013.01); *F16L 59/143* (2013.01)

(58) Field of Classification Search
CPC ..... F16L 59/182; F16L 59/065; F16L 59/143; F16L 59/075; F16L 59/181; F16L 59/185; F16L 59/21; F16L 39/005; F16L 39/04
See application file for complete search history.

(56) References Cited

U.S. PATENT DOCUMENTS

| | | | |
|---|---|---|---|
| 2,838,074 A | 6/1958 | Lauck | |
| 3,068,026 A * | 12/1962 | McKamey | F16L 39/005 62/50.7 |
| 3,152,452 A | 10/1964 | Bond, Jr. et al. | |
| 7,427,084 B1 * | 9/2008 | Betz | F16L 39/005 285/123.17 |
| 9,163,772 B2 | 10/2015 | Fish et al. | |
| 2009/0256352 A1 * | 10/2009 | Petit | F16L 39/005 285/123.15 |
| 2013/0241197 A1 | 9/2013 | Espinasse | |
| 2023/0272874 A1 * | 8/2023 | Kotnig | F16L 59/181 138/149 |

OTHER PUBLICATIONS

European Search Report for Application No. 22158908.8, mailed Jul. 27, 2022, 4 pages.

* cited by examiner

*Primary Examiner* — David Bochna
(74) *Attorney, Agent, or Firm* — Jordan IP Law, LLC; Todd A. Vaughn

(57) ABSTRACT

A thermally insulated transfer line for a deep-cooled fluid. The thermally insulated transfer line includes a process line for conduction of the fluid; an insulation envelope lying radially outside the process line and extending in a longitudinal direction of the process line; an insulation space arranged between the process line and the insulation envelope; and a coupling element provided at both ends of the thermally insulated transfer line, to connect the transfer line to a cryogenic tank, the coupling element being operable to attach the process line to a tank process line of the cryogenic tank and thereby establish a fluid-conductive connection between the process line and the tank process line. The coupling element includes an end piece, wherein the insulation envelope transforms into the end piece, and a connecting sleeve arranged concentric to and radially on an outside of the end piece so as to be attached to the end piece. The thermally insulated transfer line also includes a sliding coupling sleeve operable to connect the connecting sleeve to the cryogenic tank.

19 Claims, 4 Drawing Sheets

THERMALLY INSULATED TRANSFER LINE WITH COUPLING ELEMENT

CROSS-REFERENCE TO RELATED APPLICATIONS

The present application claims priority 35 U.S.C. § 119 to European Patent Publication No. EP 22158908.8 (filed on Feb. 25, 2022), which is hereby incorporated by reference in its entirety.

TECHNICAL FIELD

Embodiments relate to a thermally insulated transfer line for a deep-cooled fluid, in particular a transfer line with a coupling element for connection to a cryogenic tank.

BACKGROUND

Cryogenic tanks for storing deep-cooled fluids, in particular for storing hydrogen, are well known. Cryogenic tanks may also be used in mobile installations, for example for transporting fuel in vehicles and aircraft.

In order to transfer the stored medium of a cryogenic tank for example into another cryogenic tank, transfer lines may be used which may consist of two concentric pipelines with a vacuum between the pipelines. Such transfer lines are normally used for static applications and are not suitable for absorbing dynamic loads.

To couple such a transfer line to e.g. a cryogenic tank, it is known to form a coupling element on at least one end of the transfer line. The coupling element can secure the process line of the transfer line to a tank process line of the cryogenic tank, so that a fluid-conductive connection is created between the process line and the tank process line.

Such coupling elements, however, usually take up a great deal of space, in particular, in order to ensure the required thermal insulation of the process line also in the region of the coupling.

SUMMARY

Embodiments are operable to enhance thermally insulated transfer lines of said type in this respect, and in particular, indicate a thermally insulated transfer line which allows good thermal insulation in the region of a coupling, with little space requirement for the coupling.

Embodiments relate to a thermally insulated transfer line for a deep-cooled fluid, comprising a process line for conduction of the fluid, an insulation envelope lying radially outside the process line and running in the longitudinal direction of the process line, wherein an insulation space, for example a vacuum space, is formed between the process line and the insulation envelope, wherein a coupling element is provided at least at one end of the transfer line, preferably at both ends, for connecting the transfer line to a cryogenic tank, wherein the coupling element is configured such that the process line of the transfer line is attached to a tank process line of the cryogenic tank such that a fluid-conductive connection is created between the process line and the tank process line, wherein the coupling element comprises an end piece, wherein the insulation envelope of the transfer line transforms into the end piece, wherein the coupling element comprises a connecting sleeve, wherein the connecting sleeve is arranged concentrically to and radially on the outside of the end piece, and is attached, preferably welded, to the end piece, wherein a sliding coupling sleeve is configured to connect the connecting sleeve to the cryogenic tank.

In accordance with embodiments, a coupling element is used which comprises a connecting sleeve which is arranged radially outside an end piece of an insulation envelope of the transfer line. The insulation envelope of the transfer line transforms into the end piece, for example in that the insulation envelope is attached to the end piece. The end piece thus to some extent forms an extension of the insulation envelope, and hence, like the insulation envelope, delimits the insulation space. The end piece preferably has a substantially the form of a cylinder casing, i.e. a sleeve form. The connecting sleeve preferably also has a substantially the form of a cylinder casing, i.e. a sleeve form, and is arranged concentrically radially outside the end piece so that the connecting sleeve and end piece overlap axially in an overlap region. The connecting sleeve is attached to the end piece. Preferably however, a radial distance is provided between the end piece and connecting sleeve, generally over large areas and particularly preferably wherever the connecting sleeve is not attached to the end piece. Only this connecting sleeve, and not the end piece itself, is connected or attached to the cryogenic tank via a sliding sleeve coupling. Thus a heat transmission path from the process line towards the outside and towards the tank is extended and hence the thermal resistance increased. Because of the concentric arrangement of the end piece and connecting sleeve, despite the long heat transfer path, little space is required for the coupling element.

Refinements of the embodiments are given in the dependent claims, the description, and the appended drawings.

Preferably, the end piece, in an axial portion in which the end piece is surrounded by the connecting sleeve, is at least partially formed by a bellows. With such a bellows, the thermal resistance can be increased further despite the compact construction. Also, a compensation for component tolerances is thus possible, and the contact force of the process line on a tank process line of the component to be coupled can also be increased.

Preferably, the connecting sleeve is welded to the end piece via a connecting sleeve weld point, wherein the connecting sleeve weld point is formed in the vicinity of the end of the connecting sleeve facing the insulation envelope, i.e. at the axial end of the connecting sleeve facing away from the tank to be coupled.

The connecting sleeve weld point, i.e. the weld point of the connecting sleeve and end piece, is preferably formed on the end piece axially between the bellows and the insulation envelope.

Preferably, the coupling element comprises an end sleeve which is fluidically connected to the process line, wherein the coupling element is configured by means of an end sleeve such that the process line of the transfer line is attached to a tank process line of the cryogenic tank, such that a fluid-conductive connection is created between the process line and the tank process line.

The coupling element preferably comprises a union nut which is configured such that the process line of the transfer line is attached to a tank process line such that a fluid-conductive connection is created between the process line and the tank process line. The union nut preferably attaches the end sleeve of the process line to the tank process line.

The end piece is preferably not configured as a corrugated tube or corrugated hose, but is mechanically firm.

The sliding coupling sleeve is preferably arranged concentrically radially on the outside of the end piece and the connecting sleeve and is axially movable relative to the end piece and the connecting sleeve.

Particularly preferably, the sliding coupling sleeve lies radially outside the connecting sleeve, in a region in which the end piece of the insulation envelope also runs radially inside the connecting sleeve, and again the process line runs radially inside the insulation envelope. The sliding coupling sleeve is movable axially relative to the connecting sleeve. The sliding coupling sleeve preferably, at its axial end facing away from the insulation envelope, has a flange surface for connection to a connecting flange of the component to be coupled, in particular the tank.

Preferably, a nut is arranged concentrically radially on the outside of the connecting sleeve and is configured to push the sliding coupling sleeve axially against a stop of the connecting sleeve and/or axially against a connecting flange of the cryogenic tank. Preferably, a seal, in particular a radial circumferential seal, is arranged on the stop of the connecting sleeve and/or on a flange surface of the sliding coupling sleeve for attachment to the connecting flange of the cryogenic tank.

Preferably, the end piece comprises a vacuum connector, wherein via the vacuum connector, a vacuum can be created in the insulation space or the insulation space can be flooded with an inert gas.

Preferably, the end piece has a coupling space vacuum connector, wherein via the coupling space vacuum connector, a vacuum can be created in the coupling space or the coupling space can be flooded with an inert gas.

Preferably, inside the end piece, an absorbent material is arranged, in particular zeolith, active charcoal and/or getter, for example, barium.

Preferably, the process line and the insulation envelope together, at least in portions along their extent in the longitudinal direction of the transfer line, have a U-shape or a V-shape or a meandering form or a helical form. Preferably, a transfer line, more precisely, both the process line directly conducting the fluid and the insulation envelope surrounding the process line, have a U-shape or a V-shape or a meandering form or a helical form along their longitudinal direction. A "U-shape" or "V-shape" means that one, preferably more, at least two, U-shaped or V-shaped protrusions are provided axially one behind the other. The U-shape, V-shape, meandering and helical forms may be more rounded, i.e. as bends, or also more angular, e.g. as corners. Instead of a linear connection between the start and end of the process line and insulation envelope, thus bulges are provided which must then turn back in. Thus a longer line length may be obtained which is formed two-dimensionally, e.g. as a meander or U-shape or V-shape, or three-dimensionally so that adjacent meanders or U-shapes or V-shapes are twisted relative to one another and/or form a helix, in order to be able to better absorb axial forces and/or torsion moments. Thus for example, relative movements between two tanks connected by the transfer line, in particular torsional and/or axial movements, can be better absorbed in the transfer line. The transfer line is therefore preferably preformed, preferably substantially as a meander or helix, e.g. forms a spring, in particular a cylinder spring.

Preferably, the process line at least in portions is a corrugated tube or corrugated hose, and particularly preferably, the insulation envelope is also at least in portions a corrugated tube or corrugated hose.

The insulation envelope may also be concentrically surrounded by further insulation envelopes, which may again each be formed as corrugated tubes or corrugated hoses, so that in each case insulation spaces, e.g. vacuum spaces, are formed between the insulation envelopes.

Preferably, the process line and the insulation envelope together, at least substantially over the entire extent in the longitudinal direction of the transfer line, have a U-shape or a V-shape or a meandering form or a helical form, or over at least 40%, preferably at least 60%, particularly preferably at least 80% of their extent in the longitudinal direction of the transfer line. Preferably, the entire transfer line, at least the process line, insulation envelope and insulation space arranged in between, has the U-shape or V-shape or meandering form or helical form over the entire length, apart from the connection or coupling regions at the ends of the transfer lines. As stated, the "U-shape" or "V-shape" means that preferably several U-shaped or V-shaped protrusions are provided axially one behind the other to form the given extent region.

Preferably, the process line and the insulation envelope are arranged concentrically to one another, wherein the concentricity also exists along the portions along the extent of the transfer line in the longitudinal direction which have a U-shape or V-shape or meandering form or helical form.

Preferably, spacers are provided between the process line and the insulation envelope for ensuring a distance between the process line and the insulation envelope, also along the portions along the extent of the transfer line in the longitudinal direction which have a U-shape or V-shape or meandering form or helical form.

Preferably, in the insulation space, a vacuum and/or a solid insulation, and/or an inert gas such as $CO_2$, and/or a thermally reflective layer, for example a Multilayer Insulation (MLI), is provided. The inert gas is a gas which has a high setting point, in any case higher than that of air, and/or a triple point higher than the condensation temperature of oxygen. The solid insulation uses at least one or more thermally poorly conductive solids, either mixed or arranged in layers. A thermally reflective layer is a layer which reduces thermal transfer by radiation.

Preferably, in the insulation space, in portions an absorbent material is arranged, in particular zeolith, active charcoal and/or getter, for example barium.

Preferably, a protective envelope runs along the extent of the insulation envelope, radially outside the insulation envelope, wherein preferably the protective envelope does not have the U-shape or V-shape or meandering form or helical form, wherein the protective envelope particularly preferably has a cylinder casing form, i.e. flat walls. The thermally insulated cryogenic line, preferably in the form of a "cylinder spring," is thus preferably conducted between two tanks by means of an external protective tube.

Preferably, at least in portions, a damping material and/or an elastic material is arranged between the protective envelope and the insulation envelope, for example on the inside of the protective envelope or on the outside of the insulation envelope or in the entire intermediate space. The damping material and/or elastic material may serve to damp vibrations and/or to support the preformed, in particular helical lines, and for protection at the contact points of the insulation envelope and protective envelope.

Preferably, the protective envelope comprises at least two envelope parts which are movable axially relative to one another, wherein the envelope parts are preferably connected together by a bellows and/or a bush and/or a sleeve, and/or are radially nested so that one envelope part can slide radially inside or outside the other envelope part in an overlap portion.

DRAWINGS

Embodiments will be illustrated by way of example in the drawings and explained in the description hereinbelow.

Figure 5:
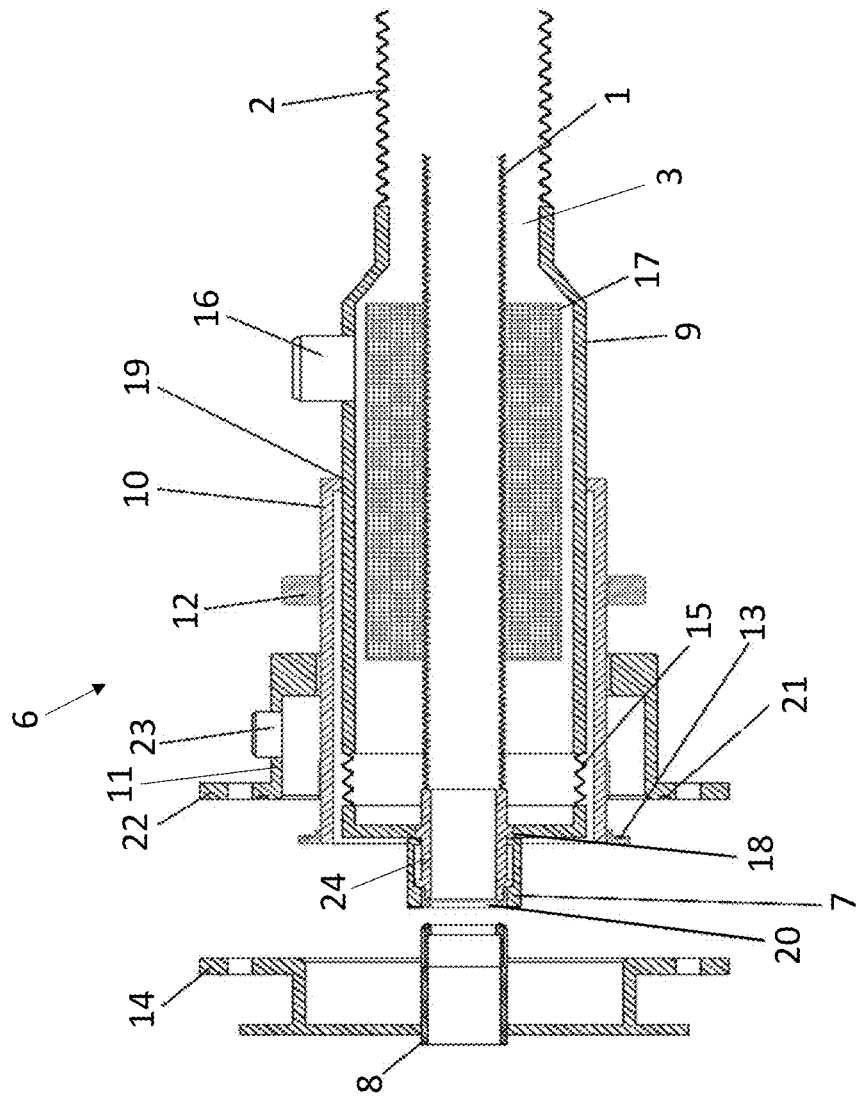
FIG. 5 illustrates a sectional view at one end of a transfer line according to the invention, in open state.
Figure 7A:
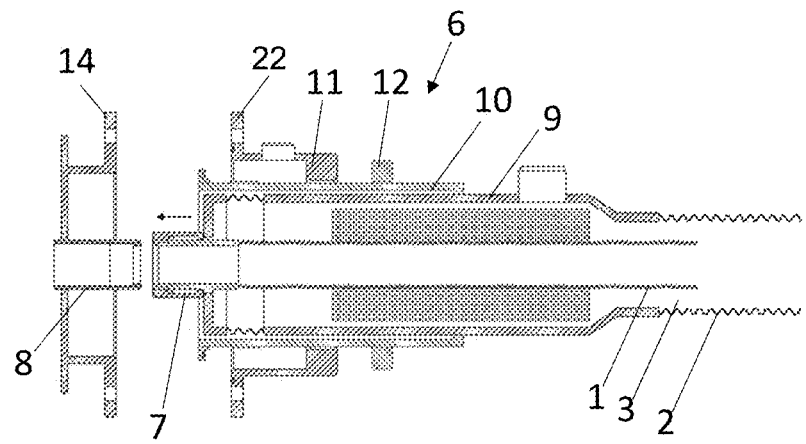
Figure 7B:
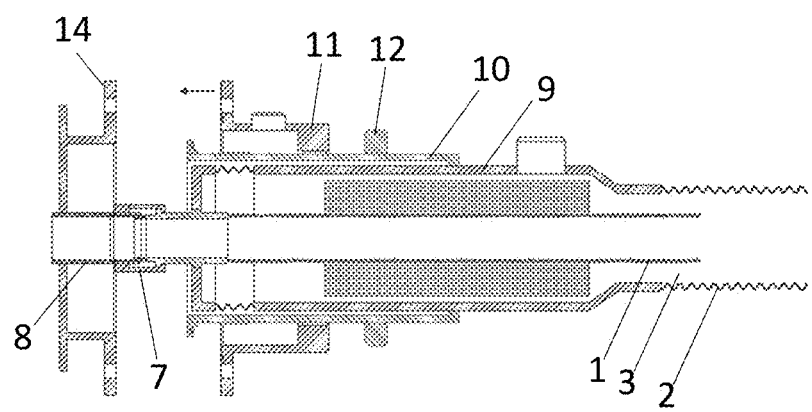
Figure 7C:
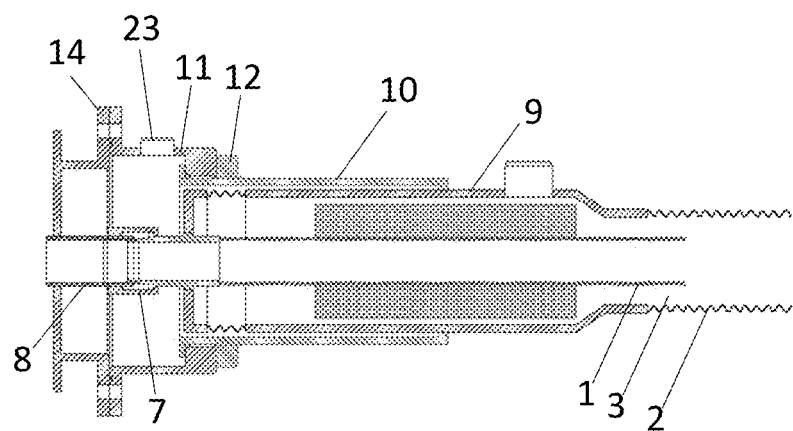

FIGS. 7A to 7C respectively illustrate a sectional view of a coupling element of FIG. 5 in a three process steps on connection of the coupling element.

DESCRIPTION

Figure 1:
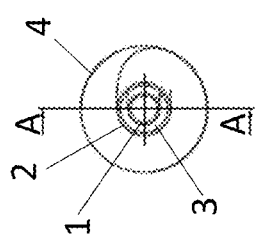
FIG. 1 illustrates a sectional view from the front of a thermally insulated transfer line according to the invention.

FIG. 1 illustrates a sectional view from the front of a thermally insulated transfer line in accordance with embodiments. The transfer line comprises a radially inner process line 1 for conducting a fluid, in particular, hydrogen, and an insulation envelope 2 lying radially outside the process line 1, running or extending in the extent of the process line 1 and concentric to the process line 1. An insulation space 3 is provided between the process line 1 and the insulation envelope 2. The process line 1, the insulation envelope 2, and the insulation space 3 have a helical form in the longitudinal direction of the transfer line, as indicated in FIG. 1.

FIG. 1 furthermore illustrates a protective envelope 4 which is arranged radially outside the insulation envelope 2 and run or extend substantially in the longitudinal direction of the process line 1 and the insulation envelope 2. The protective envelope 4 does not have a helical form, but is formed flat, and thus, has a cylinder casing form.

Figure 4:
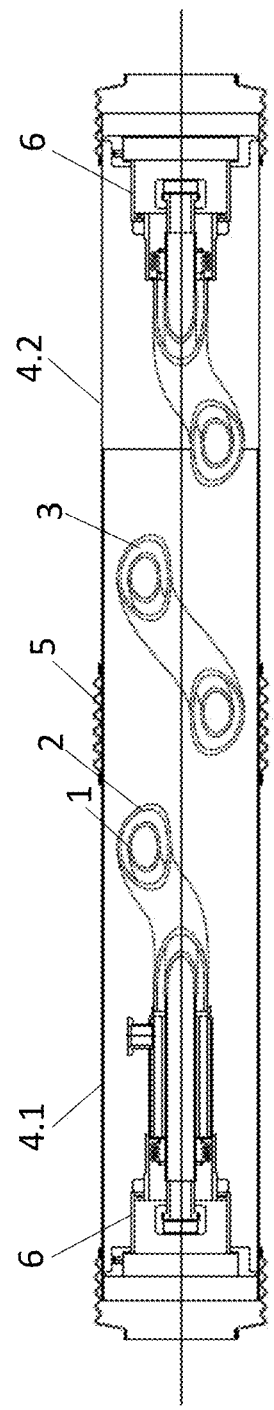
FIG. 4 illustrates a sectional view of a transfer line according to the invention along section A-A of FIG. 1 with coupling elements and protective envelope.
Figure 3:
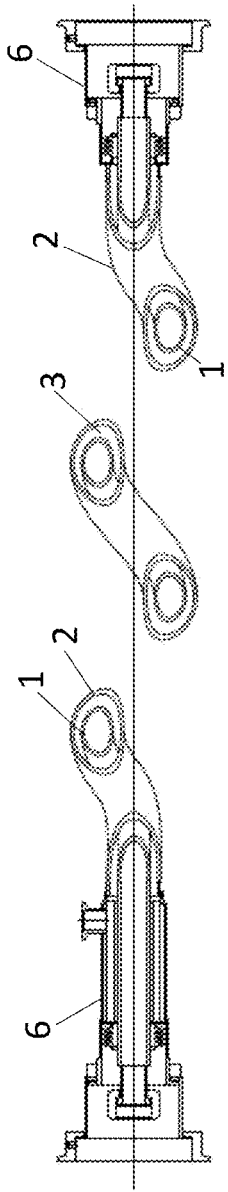
FIG. 3 illustrates a sectional view of a transfer line according to the invention along section A-A of FIG. 1 with coupling elements.
Figure 2:
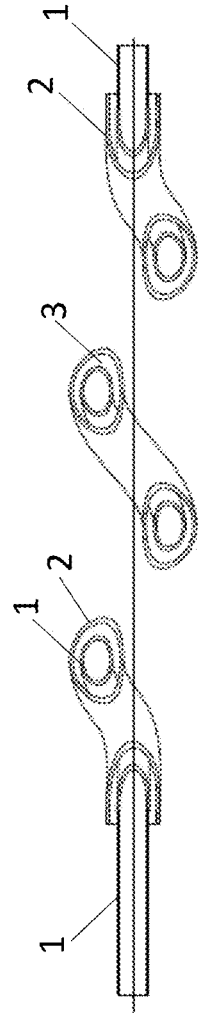
FIG. 2 illustrates a sectional view of a transfer line according to the invention along section A-A of FIG. 1 but without showing the coupling elements.

FIGS. 2, 3, and 4 illustrate a side view of the transfer line of FIG. 1, corresponding to section A-A from FIG. 1. FIG. 2 does not illustrate the protective envelope 4. FIG. 3 illustrates, in addition to the process line 1 and insulation envelope 2, coupling elements 6 at both ends of the transfer line, in accordance with embodiments. FIG. 4 also illustrates a protective envelope 4, as in FIG. 1, running or extending over the entire length of the transfer line.

In accordance with embodiments, the innermost element of a transfer line is thus the process line 1, in particular, a corrugated pipe in which the deep-cooled fluid is transported. The process line 1 is surrounded by one or more concentric corrugated hoses, namely insulation envelopes 2, each of which is thermally insulated by an insulation space 3 and optional MLI from the respective next innermost corrugated hose. The distance between the hoses of the process line 1 and the insulation envelope 2 is guaranteed by a suitable device, e.g. spacers, which may, for example, run or extend in the longitudinal direction of the transfer line. In addition, absorption means may be placed in the insulation space 3 to enhance the long-term stability of the vacuum.

The ends of the transfer line are terminated with corresponding fittings or connections, in particular, the coupling elements 6.

For protection and guidance, the process line 1 is conducted, for example, between two tanks inside an external envelope tube, namely the protective envelope 4, as illustrated in FIG. 4. The external envelope tube, i.e., the protective envelope 4, serves mainly for protection against stone impact, weathering, and corrosion, but also secures the vacuum line against touch and associated risks from the very low temperatures. The external envelope tube, i.e., the protective envelope 4, is also used for safe mounting and as a damping element. The damping is achieved by direct pressing of the vacuum line formed by the process line 1 and the insulation envelope 2, which may be sheathed with plastic, against the external corrugated tube, and prevents damage by modulation of frequency and minimizing of the vibration amplitude.

As illustrated in FIG. 4, the protective envelope 4 comprises at least two envelope parts, a first envelope part 4.1 and a second envelope part 4.2 which are axially movable relative to one another. The first envelope part 4.1 and the second envelope part 4.2 are connected together by a bellows 5 and radially nested, so that the first envelope part 4.1 can be axially moved radially inside or outside the second envelope part 4.2 in an overlap portion.

Figure 6:
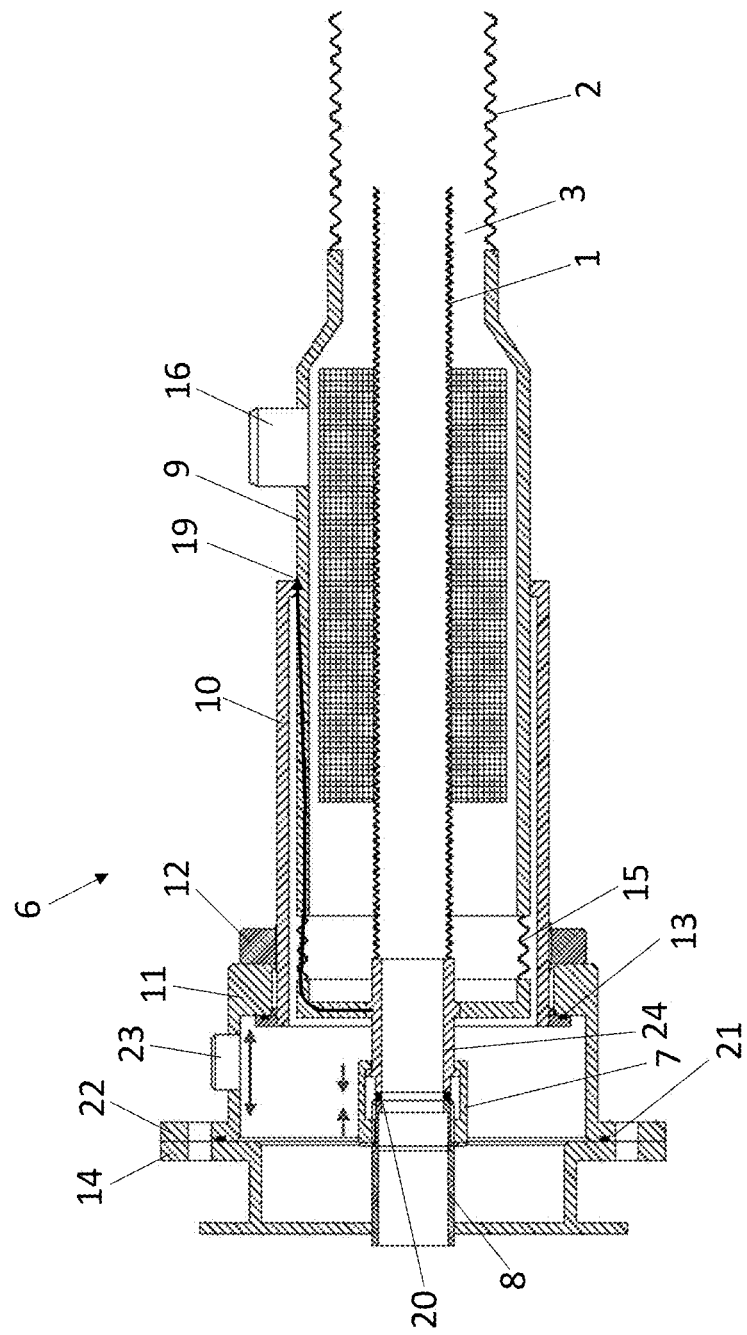
FIG. 6 illustrates a sectional view of a coupling element at one end of a transfer line according to the invention according to FIG. 5, in a connected state.

At least at one end, in the embodiment illustrated in FIGS. 3 and 4, at both ends, the transfer line has coupling elements 6 which are shown in more detail in FIGS. 5 and 6.

As illustrated in FIG. 5, a coupling element 6 comprises the following parts: the insulation envelope 2 transforms into a mechanically firm end piece 9, for example, by fixing. The process line 1 also has a firm sleeve at its end, namely the end sleeve 24, which is welded to the end piece 9 at an end piece weld point 18.

The coupling element 6 allows an increase in thermal conduction resistance with a compact structure of the end piece of the transfer line. The process line 1 and the insulation envelope 2 are welded tightly in the end piece, namely the coupling element 6, as described hereinabove, and this weld point 18 constitutes a good thermal connection. In order to reduce the heat transfer into the deep-cooled fluid along the insulation envelope 2 of the end piece, and to avoid temperatures below the liquefaction point of oxygen at the insulation sleeve 2 of the end piece, the thermal resistance to thermal conductivity in the insulation envelope 2 of the end piece coupling element 6 is increased. For a predefined material e.g. steel, the resistance can be increased by geometry adaptation, in particular by a small cross-section and long conduction path (the heat transfer path is drawn as an arrow in FIG. 6).

A preferably thin-walled bellows 15 forms a portion of the end piece 9 and increases the thermal resistance by extension of the conduction path because of the corrugated form. A connecting sleeve 10 increases the thermal resistance by extending the conduction path because of the weld connection 19 to the end piece 9 which is offset in the direction of the vacuum connector 16. The mounting of the coupling element and the compensation of mounting tolerances to guarantee the required contact forces of the seals is described below, see also FIG. 6.

The process line 1 and insulation envelope 2 must be tightly connected to the tank/dewar comprising the tank process line 8 and connecting flange 14. Firstly, the two process lines 8, 1 are butt-connected via a union nut 7. By tightening the union nut 7, a process line seal 20 is compressed at the end between the pipe ends. Access for mounting the process line 1 is possible by sliding back a sliding coupling sleeve 11 which slides on the connecting sleeve 10. After connecting the process lines 1, 8, the sliding coupling sleeve 11 is fixed with a nut 12 against the sealing face 13 on the connecting sleeve 10, in particular at a stop of the connecting sleeve 10, wherein a flange of the sliding coupling sleeve 11 is pressed against the connecting flange 14 of the tank/dewar and hence the transfer line of the tank/dewar is pressed. The opposing forces are shown as arrows in FIG. 6. As a result, the (required) contact forces of the process line seal 20 between the process lines 1, 8, and/or the connecting sleeve seal 13 between the connecting sleeve 10 and sliding coupling sleeve 11, and the connecting flange seal 21 between the sliding coupling sleeve 11, or more precisely the flange face 22 of the sliding coupling sleeve 11, and the connecting flange 14 of the tank/dewar are reduced, and the sealing effect is lessened. The bellows 15 in the end piece 9 partially compensates for this loss of contact force. The position of the bellows 15 in the end piece 9 reduces the loading with torsion and bending moments.

Thus the connecting sleeve 10 serves to increase the thermal resistance despite the compact construction; the bellows 15 serves to increase the thermal resistance despite the compact construction, to compensate for mounting tolerances and to guarantee adequate contact force for the sealing effect; and the sliding coupling sleeve 11 allows access to the process lines 1, 8 and forms a connection, namely at a coupling space vacuum connector 23, for evacuating the coupling space or rendering this inert.

FIGS. 7A to 7C illustrate steps in connecting the coupling element 6 to a tank and the possibility of quickly and easily rendering the coupling space inert.

FIG. 7A illustrates how the coupling element 6 is brought up to the tank in order to connect the process line 1 to the tank process line 8 (in the direction of the arrow).

FIG. 7B illustrates the union nut 7 already closed around the process lines 1, 8, and the sliding coupling sleeve 11 is moved in the direction towards the tank (arrow) where it is connected to the connecting flange 14 by means of the nut 12.

FIG. 7C illustrates the connected coupling element 6 with connected union nut 7 and nut 12, so that the coupling space can be evacuated or rendered inert via the coupling space vacuum connector 23. After connection of the coupling, therefore, via the coupling space vacuum connector 23, at the sliding coupling sleeve 11, the relatively small coupling space separated from the transfer line and tank can rapidly and easily be evacuated or rendered inert with an inert gas with sufficiently high setting point.

The terms "coupled," "attached," or "connected" may be used herein to refer to any type of relationship, direct or indirect, between the components in question, and may apply to electrical, mechanical, fluid, optical, electromagnetic, electromechanical, or other connections. In addition, the terms "first," "second," etc. are used herein only to facilitate discussion, and carry no particular temporal or chronological significance unless otherwise indicated.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

LIST OF REFERENCE SYMBOLS

1 Process line
2 Insulation envelope
3 Insulation space
4 Protective envelope
4.1 First envelope part
4.2 Second envelope part
5 Bellows
6 Coupling element
7 Union nut
8 Tank process line
9 End piece
10 Connecting sleeve
11 Sliding coupling sleeve
12 Nut
13 Stop of connecting sleeve, seal of connecting sleeve
14 Connection flange
15 Bellows
16 Vacuum connector
17 Absorbent material
18 End piece weld point
19 Connecting sleeve weld point
20 Process line seal
21 Connecting flange seal
22 Flange surface
23 Coupling space vacuum connector
24 End sleeve

What is claimed is:

1. A thermally insulated transfer line for a deep-cooled fluid, the thermally insulated transfer line comprising:
 a process line for conduction of the deep-cooled fluid;
 an insulation envelope lying radially outside the process line and extending in a longitudinal direction of the process line;
 an insulation space arranged between the process line and the insulation envelope;
 a coupling element provided at both ends of the thermally insulated transfer line, to connect the transfer line to a cryogenic tank, the coupling element being operable to attach the process line to a tank process line of the cryogenic tank and thereby establish a fluid-conductive connection between the process line and the tank process line, the coupling element comprising:
  an end piece, wherein the insulation envelope transforms into the end piece,
  a connecting sleeve arranged concentric to and radially on an outside of the end piece so as to be attached to the end piece,
  a sliding coupling sleeve operable to connect the connecting sleeve to the cryogenic tank; and
  a protective envelope, formed as a cylinder casing, that extends along and radially outside of the insulation envelope.

2. The thermally insulated transfer line of claim 1, wherein the end piece is at least partially formed by a bellows in an axial portion in which the end piece is surrounded by the connecting sleeve.

3. The thermally insulated transfer line of claim 1, wherein:
 the connecting sleeve is attached to the end piece via a welded connection that comprises a connecting sleeve weld point, and
 the connecting sleeve weld point is formed adjacent to an end of the connecting sleeve facing the insulation envelope.

4. The thermally insulated transfer line of claim 3, wherein the connecting sleeve weld point is formed on the end piece axially between the end piece and the insulation envelope.

5. The thermally insulated transfer line of claim 1, wherein the coupling element further comprises an end sleeve which is fluidically connected to the process line.

6. The thermally insulated transfer line of claim 1, wherein the coupling element further comprises a union nut which is operable to attach the process line to the tank process line such to form the fluid-conductive connection between the process line and the tank process line.

7. The thermally insulated transfer line of claim 1, wherein the sliding coupling sleeve is arranged concentrically radially on an outside of the end piece and/or the connecting sleeve and is axially movable relative to the end piece and/or the connecting sleeve.

8. The thermally insulated transfer line of claim 1, further comprising a nut arranged concentrically radially on an outside of the connecting sleeve and is operable to push the sliding coupling sleeve axially against a stop of the connecting sleeve and/or axially against a connecting flange of the cryogenic tank.

9. The thermally insulated transfer line of claim 1, wherein the end piece comprises a vacuum connector operable to form a vacuum in the insulation space or the insulation space.

10. The thermally insulated transfer line of claim 1, wherein the end piece has a coupling space vacuum connector operable to form a vacuum in the coupling space or the coupling space can receive an inert gas.

11. The thermally insulated transfer line of claim 1, wherein the process line and the insulation envelope, at least in portions along their extent in a longitudinal direction of the transfer line, collectively form a U-shape or a V-shape or a meandering form or a helical form.

12. The thermally insulated transfer line of claim 1, wherein the process line and the insulation envelope, at least at least 80% along their extent in a longitudinal direction of the transfer line, collectively form a U-shape or a V-shape or a meandering form or a helical form.

13. The thermally insulated transfer line of claim 1, wherein:
the process line, at least in portions thereof, comprises a corrugated tube or corrugated hose, and/or
the insulation envelope, at least in portions thereof, comprises a corrugated tube or corrugated hose.

14. The thermally insulated transfer line of claim 1, wherein:
the process line and the insulation envelope are arranged concentric to one another at least in portions along their extent in a longitudinal direction of the transfer line, in which they collectively form a U-shape or a V-shape or a meandering form or a helical form.

15. The thermally insulated transfer line of claim 1, further comprising spacers arranged between the process line and the insulation envelope to maintain a distance between the process line and the insulation envelope, also at least in portions along their extent in a longitudinal direction of the transfer line, in which they collectively form a U-shape or a V-shape or a meandering form or a helical form.

16. The thermally insulated transfer line of claim 1, wherein a vacuum, and/or a solid insulation, and/or an inert gas, and/or a thermally reflective layer, is arranged in in the insulation space.

17. The thermally insulated transfer line of claim 1, wherein:
the protective envelope comprises at least two envelope parts which are axially movable relative to each another, and
the at least two envelope parts are connected together by a bellows, and/or a bush, and/or a sleeve,
the at least two envelope parts are radially nested so that one envelope part slides radially inside or outside the other envelope part in an overlap portion.

18. A thermally insulated transfer line for a fluid, the thermally insulated transfer line comprising:
a process line for conduction of the fluid;
an insulation envelope lying radially outside the process line and extending in a longitudinal direction of the process line;
an insulation space arranged between the process line and the insulation envelope;
a coupling element provided at both ends of the thermally insulated transfer line, to connect the transfer line to a cryogenic tank, the coupling element being operable to attach the process line to a tank process line of the cryogenic tank and thereby establish a fluid-conductive connection between the process line and the tank process line, the coupling element comprising:
an end piece, wherein the insulation envelope transforms into the end piece,
a connecting sleeve arranged concentric to and radially on an outside of the end piece so as to be attached to the end piece,
a sliding coupling sleeve operable to connect the connecting sleeve to the cryogenic tank;
a protective envelope, formed as a cylinder casing, that extends along and radially outside of the insulation envelope; and
a damping material arranged, at least in portions, between the protective envelope and the insulation envelope.

19. A thermally insulated transfer line for a fluid, the thermally insulated transfer line comprising:
a process line for conduction of the fluid;
an insulation envelope lying radially outside the process line and extending in a longitudinal direction of the process line;
an insulation space arranged between the process line and the insulation envelope;
a coupling element provided at both ends of the thermally insulated transfer line, to connect the transfer line to a cryogenic tank, the coupling element being operable to attach the process line to a tank process line of the cryogenic tank and thereby establish a fluid-conductive connection between the process line and the tank process line, the coupling element comprising:
an end piece, wherein the insulation envelope transforms into the end piece,
a connecting sleeve arranged concentric to and radially on an outside of the end piece so as to be attached to the end piece,
a sliding coupling sleeve operable to connect the connecting sleeve to the cryogenic tank; and
an absorbent material arranged in the insulation space.

* * * * *